United States Patent

[11] 3,617,638

| [72] | Inventors | Dieter Jochimsen<br>Winchester;<br>Jurgen Kok, Bedford, both of Mass. |
|---|---|---|
| [21] | Appl. No. | 749,557 |
| [22] | Filed | July 17, 1968 |
| [45] | Patented | Nov. 2, 1971 |
| [73] | Assignee | Audac Corporation<br>Burlington, Mass. |

[54] SYSTEM FOR VERIFYING CREDIT CARD TRANSACTIONS
14 Claims, 7 Drawing Figs.

[52] U.S. Cl....................................................... 179/2 DP,
235/61.7 B, 179/90 B
[51] Int. Cl......................................................H04m11/06
[50] Field of Search........................................... 179/2 DP,
2, 90 C; 340/149, 152, 147 P, 152, 163; 235/61.7 B

[56] References Cited
UNITED STATES PATENTS

| 3,465,289 | 9/1969 | Klein .......................... | 340/149 |
| 3,400,378 | 9/1968 | Smith.......................... | 179/2 |
| 3,381,276 | 4/1968 | James.......................... | 340/172.5 |
| 2,018,420 | 10/1935 | Robinson ..................... | 178/3 |
| 1,927,556 | 9/1933 | Nelson ......................... | 178/2 |
| 3,492,650 | 1/1970 | Hesselgren ................... | 179/5 |
| 3,407,388 | 10/1968 | Goldman...................... | 340/152 |
| 3,394,246 | 7/1968 | Goldman...................... | 235/61.7 |
| 3,359,369 | 12/1967 | Di Iorio ....................... | 179/2 |
| 3,344,258 | 9/1967 | Michels....................... | 340/146.1 |
| 3,315,230 | 4/1967 | Weingart...................... | 340/149 |
| 3,308,238 | 3/1967 | Brothman et al. ............ | 340/163 |
| 3,184,714 | 5/1965 | Brown et al................... | 340/149 |

*Primary Examiner*—Kathleen H. Claffy
*Assistant Examiner*—Tom D'Amico
*Attorney*—Cesari & McKenna

ABSTRACT: A transaction recording and verifying system employs data transmitters at remote locations where the transactions are made. Upon activation, each transmitter dials the telephone number of the data processing unit and after an acknowledgment signal has been received, it transmits over the telephone line numerical signals identifying the location of the transmitter; customer identifying signals automatically read from a credit card used in the transaction; and dollar amount signals obtained from a register into which the amount of the transaction has been entered by a cashier. The data processing unit then emits a signal indicating whether or not a lost, stolen or bogus credit card has been detected or the customer is delinquent in payment for previous transactions.

PATENTED NOV 2 1971 3,617,638

INVENTORS
DIETER JOCHIMSEN
JURGEN KOK

BY *Blair Cesari + St. Onge*

ATTORNEYS

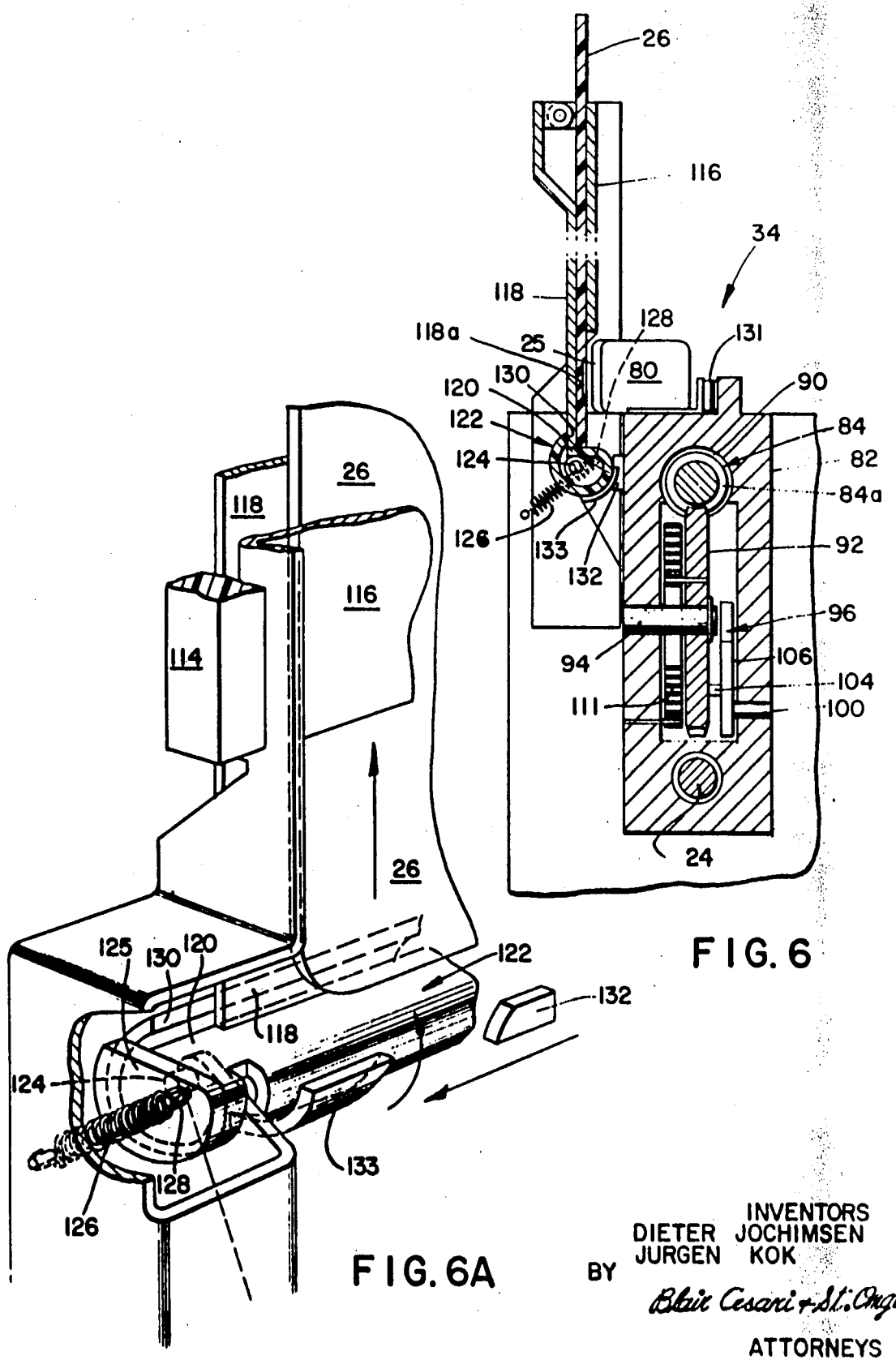

3,617,638

SYSTEM FOR VERIFYING CREDIT CARD TRANSACTIONS

BACKGROUND OF THE INVENTION

1. Field of the Invention

This invention relates to a system for relaying over telephone lines information which is derived partly from a credit card and partly from details of a transaction in which the card is used. The invention is directed specifically to essentially instantaneous verification of the validity of credit card transactions and recording of the amounts of such transactions by relaying appropriate information to a centrally located data processing unit.

2. Prior Art

The use of credit cards has burgeoned dramatically in recent years, largely because of the large number of establishments that will honor such cards. At the same time, losses caused by the use of stolen and counterfeit credit cards have increased at a very fast rate. When the owner of a credit card informs the issuing company that his card has been lost or stolen, the company assumes liability for further use of the card. It then transmits the number of the card to all of the retail establishments that honor the company's cards and after that further loss falls upon any establishment that accepts the card in a transaction.

There are so many credit cards in this category that it is practically impossible for a clerk or cashier to check each card against a list of unacceptable cards prior to making each transaction. As a result, retail establishments have incurred losses estimated by some to amount to several hundred dollars per year from this cause alone.

Counterfeit cards present a similar problem. A large number of such cards are bound to be honored, with ultimate loss either to the retail establishments or to the credit card companies.

The honoring of credit cards whose holders have failed to pay their bills also results in substantial losses.

It has been suggested that these losses might be substantially reduced by instantaneously transmitting information about each transaction to a central electronic data processing unit which would rapidly check the information. The data processing unit would then emit a signal indicating whether or not the transaction is acceptable. The principal object of this invention is an efficient system of this nature.

Another object of the invention is to provide a system of the above type having a relatively low cost.

A further object is to provide a data-transmitting unit for use at the remote locations where the transactions are made.

Yet another object is to provide a data-transmitting unit that is easily used by relatively unskilled personnel.

A further object of the invention is to provide a data-transmitting unit having a relatively small space requirement.

A further object of the invention is a data-transmitting unit characterized by reliable, high-speed operation.

Other objects of the invention will in part be obvious and will in part appear hereinafter.

SUMMARY OF THE INVENTION

In general, out system employs a data transmitter at each remote location. When a credit card transaction is made at that location, the card is inserted into the transmitter and the cashier activates the transmitter to transmit to a central data processing unit the amount of the transaction, as well as numbers identifying both the remote location and the credit card holder. If the credit card is acceptable, the data processing unit responds with an appropriate signal, whereupon the operator at the remote location consummates the transaction.

The use of cards whose loss or theft has been communicated to the credit card company will be virtually eliminated by storing such information in the data processing unit and programming it to reject such cards. The same protection is afforded against the use of cards by legitimate card holders whose accounts are in default.

A conventional telephone circuit serves as the medium of communication between each data transmitter and the centrally located data processing unit. This provides essentially instantaneous transfer of information at a relatively low cost. Another factor making for low cost is the design of the data transmitter, which can be used for normal telephone calls, as well as transmission of credit card information. Thus, there is no need to subscribe to an additional telephone circuit and the cost of each data transmission in the credit card system is only the incremental cost of a telephone call. Yet, the entire transmitter is compact and requires little more space than a conventional telephone instrument.

Moreover, the data transmitter is easily used by unskilled personnel. A cashier or other employee at the remote location merely removes the telephone handset from the hook switch and presses a button which causes the transmitter to dial the telephone number of the data processing unit. If the call goes through, the processing unit responds with an audible signal. The cashier then actuates a switch which causes the transmitter to send signals containing the relevant data of the transaction. The signals identifying the credit card holder are automatically read from the card itself. The amount of the transaction is obtained from a register into which the cashier has entered the amount.

The data processing unit then checks the credit card number to see if it is valid, i.e., a number for which no one has reported a theft and which has not been suspended for failure of the holder to pay his bills. It also checks the amount of the transaction against a "profile" of transactions of the card holder. If the amount and frequency of the most recent transactions do not correspond with the same parameters in the card holder's previous history of transactions, there is a fairly good chance that the holder himself is not using the card and that the present use is therefore unauthorized. Whenever the data processing unit indicates a problem, someone at that location converses with the cashier over the telephone line and if necessary he also talks to the customer to decide whether or not the credit card should be honored.

BRIEF DESCRIPTION OF THE DRAWINGS

For a fuller understanding of the nature and objects of the invention, reference should be had to the following detailed description taken in connection with the accompanying drawings, in which:

FIG. 6 is an end view with parts in section of the card reader; and

FIG. 6A is an enlarged fragmentary perspective view of a portion of the card reader.

DETAILED DESCRIPTION OF THE INVENTION

Figure 1:
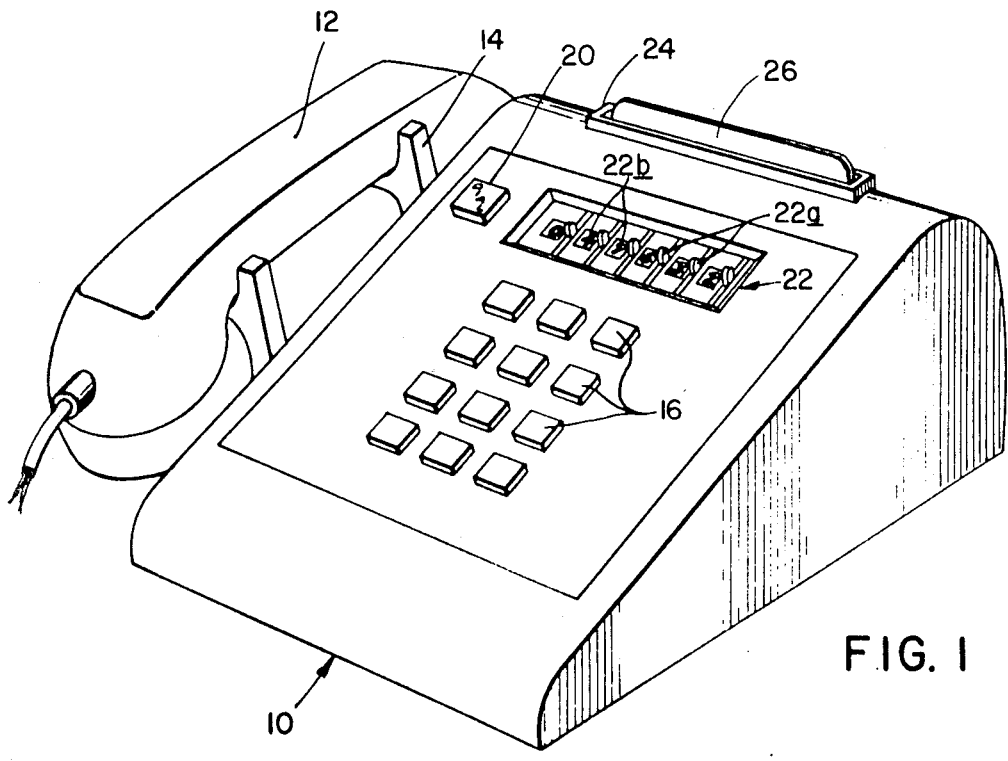
FIG. 1 is a pictorial view of a data transmitter embodying the invention.

As shown in FIG. 1 a data transmitter 10 embodying the invention has the general appearance of a conventional pushbutton telephone. It includes the usual handset 12 resting on a hook 14 which is connected to an ordinary hook-switch (not shown). The transmitter 10 also includes a set of pushbuttons 16 connected in a conventional tone dialing arrangement in which each button is represented by two tones in a two-out-of-eight code.

Additionally, transmitter 10 has an automatic dialing button 20 that initiates dialing of the telephone number of a central data processing unit. It also includes a register 22 indicating the amount of each transaction. The operator enters the amount into the register by means of thumb wheels 22a. Each wheel 22a is connected to an indicator wheel 22b which indicates one digit of the amount of the transaction, and to a multiple position switch (not shown) whose position provides an electrical output indicative of the same digit.

Finally, the transmitter 10 has a slot 24 which accommodates cards 26 used in the transactions. As described below, the transmitter reads identifying indicia from each credit card and then transmits them to the data processing unit along with the amount of the transaction entered into the register 22.

Figure 2:
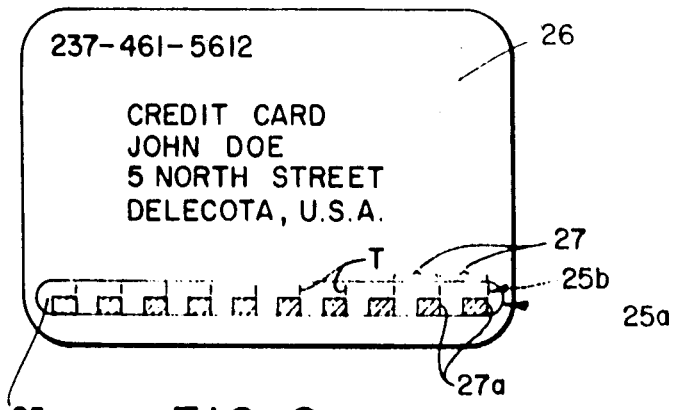
FIG. 2 depicts a credit card used in the system.

FIG. 2 illustrates the configuration of one of the credit cards 26. On its face are the usual visible information, i.e., the name and address of the credit card holder and his identification number. The card also contains an elongated magnetic medium 25 carrying the identification number in magnetic form for automatic reading by the data transmitter 10. The medium 25, which may take the form of ordinary magnetic recording tape, is recessed below the surface of the card 26 to minimize scratching and abrasion by other objects contacting the card. This also avoids "print through" when cards are positioned face to face.

In the system specifically described herein, the identifying number is recorded in a track 25a in a series of digit segments 27, each segment containing one digit of the number. In each segment 27 the corresponding digit is recorded in a data portion 27a. In the present example the portion 27a comprises the half of the data segment 27 first traversed by a data reading head moving along the medium 25 from right to left to read the identifying number from the card 26. A preferred mode of magnetically encoding each digit in the identifying number is to magnetize successive, spaced bands of the corresponding data portion 27a, the number of such bands being equal to the digit itself. Thus, with the identification number shown in FIG. 2, the first digit segment 27 will have two magnetized bands in its data portion 27a; the next data portion 27a will contain three magnetized bands; the succeeding one will have seven such bands, and so on. When the data reading head passes over the first data portion 27a it will therefore emit two electric pulses which can be counted to ascertain the first digit. As the reading head passes over the second data portion 27a, it will emit three such pulses, and so on.

The magnetic medium also has a timing track 25b in which a series of timing bands T are recorded, one for each data portion 27a in the track 25a. A second reading head moving with the data reading head senses the timing bands and emits timing pulses in response thereto just before the data head enters the corresponding data portions 27a. The timing pulses synchronize the card reading operation in an arrangement described in detail below.

Other forms of magnetic recording can also be used and so also can other forms of encoding. Nor does the identifying number have to be recorded magnetically for automatic reading of the card 26. For example, optical arrangements can also be used. The preferred arrangement, however, is easily implemented and it contributes to the relatively simple arrangement of the data transmitter 10.

Figure 3:
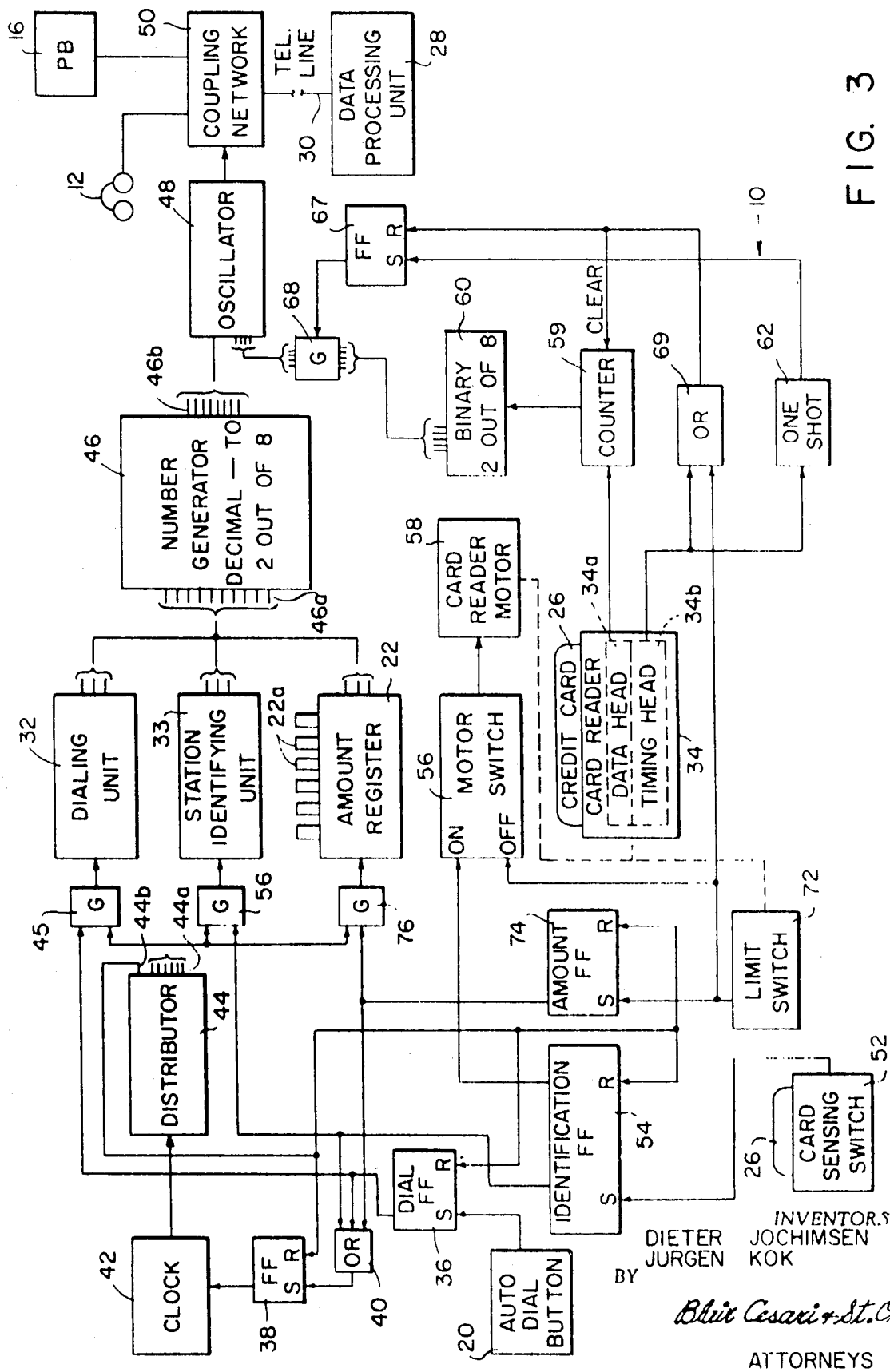
FIG. 3 is a schematic diagram of a credit card transaction system embodying the invention.

FIG. 3 illustrates a system in which the information from the data transmitter 10 is conveyed to a data processing unit 28 over a conventional telephone circuit 30 by means of the same tone signals used in dialing. Thus, four items of information are transmitted in this fashion, but only three of these are used by the data processing unit. The telephone number of the data processing unit 28, which is stored in a dialing unit 32, is used only the the telephone system in making the connection between the transmitter 10 and the data processing unit. The second item of information is the identification number of the transmitting station 10; this is stored in a station identifying unit 33. The identification number of the card holder is recorded on the credit card 26; a card reader 34 retrieves this number for transmission to the data processing unit 28. Finally, the amount register 22 contains the amount of the transaction which, is the sequence described below, is the last item of information sent to the data processing unit.

Ordinarily, the cashier or other operator of the data transmitter 10 first enters the amount of the transaction into the amount register 22 and deposits the credit card 26 in the slot 24 (FIG. 1). He then presses the automatic dialing button 20 to initiate operation of the system. This sets a dial flip-flop 36 whose output, in turn, sets a flip-flop 38 by way of an OR circuit 40. The resulting output of the flip-flop 38 turns on a clock 42 connected to a distributor 44.

It should be noted that the various flip-flops in the circuit respond to the leading edges of pulses or voltage steps applied to them, and in particular, they are not constrained to remain in the same state by continuing voltage levels.

The distributor 44 has a set of output terminals 44a and a further output terminal 44b. A single one of the output terminals carries the distributor output voltage at any one time and this output voltage is shifted from terminal to terminal in succession in response to successive pulses from the clock 42. Initially, the output terminal 44b is energized so that succeeding clock pulses cycle the output voltage through all of the terminals 44a.

Setting of the dial flip-flop 36 also enables a set of gates 45 connecting the distributor output terminals 44a to the dialing unit 32. The dialing unit in turn passes the respective output voltages from the terminals 44a to a decimal-to-two-out-of-eight converter 46 which energizes a set of oscillators 48. The oscillators 48 generate the conventional telephone dialing tones. Specifically, the converter 46 has 12 input terminals 46a corresponding to the digits 0–9 and the symbols * and ◊; it contains an encoding matrix that converts an input voltage on any one of the input terminals to voltages on two-out-of-eight output terminals 46b. The two outputs cause two of the oscillators 48 to generate tones corresponding to the energized input terminal 46a.

Functionally, the dialing unit 32 consists of a set of conductors connecting each of the distributor output terminals 44a to one of the converter input terminals 46a in accordance with the number to be dialed. For example, if the first digit in the telephone number of the data processing unit 28 is a five, the dialing unit 32 will, in essence, connect the first of the terminals 44a to the converter input terminal 46a corresponding to the digit 5. As the distributor 44 cycles through successive terminals 44a, the successive digits of the data processing unit telephone number are thus generated in the tone code by the oscillators 48 and transmitted on to the telephone line 30 by way of a coupling network 50.

After the telephone number has thus been dialed, the following clock pulse returns the output voltage of the distributor 44 to the terminal 44b, thereby resetting the flip-flops 36 and 38. This turns off the clock 42; it also disables the gates 45, thereby disconnecting the distributor 44 from the dialing unit 32.

If the telephone system completes a connection to the data processing unit 28, the data processing unit responds with a signal that the operator of the data transmitter 10 hears in the handset 12. The operator thereupon depresses the card 26 in the slot 24 (FIG. 1 and thus activates a card sensing switch 52 (FIG. 3) to set an identification flip-flop 54. The output of the flip-flop 54 sets the flip-flop 38 to turn on clock 42 and it also enables a set of gates 56 which connect the distributor output terminals 44a to the station identifying unit 33. The identifying unit 33 has the same construction as the dialing unit 32 except that its internal connections cause the converter 46 and oscillators 48 to generate a series of tones corresponding to the successive digits in the identifying number of the data transmitter 10.

When the station identifying number has thus been transmitted to the data processing unit 28, the output voltage of the distributor 44 again returns to the output terminal 44b, thereby resetting the flip-flops 38 and 54. This turns off the clock 42 and disables the gates 56. Also, the resulting output of the flip-flop 54 causes a motor switch 57 to turn on a card reader motor 58. The motor then causes the card reader 34 to read the card identifying number from the credit card 26. The details of the card reader 34 and its mode of operation are described in detail below. At this point, it is sufficient to know that a data reading head 34a and a timing head 34b move along the magnetic medium 25 (FIG. 2) and successively sense the respective magnetized bands thereon. The bands in the data track 25a are converted to electric pulses by the reader 34 and then counted by a binary counter 59. The contents of the counter 59 are periodically applied to a binary-to-two-out-of-eight converter 60. The converter 60 in turn energizes the two oscillators 48 in accordance with the respective contents of the counter 59, so as to transmit the card identifying number over the telephone line 30 to the data processing unit 28.

More specifically, when the timing head 34b passes over the first timing band T in the timing track 25b (FIG. 2), it emits a pulse that triggers a one-shot multivibrator 62. The multivibrator 62 remains in its unstable state for the interval in which the data head 34a traverses the data portion 27a of the first digit segment 27 on the data track 25a, e.g., 50 milliseconds.

As the motor 58 propels the data head 34a through the first data portion 27a on the card, the counter 59 counts the number of magnetized portions in the data portion, this number being the first digit of the identifying number of the card 26. Shortly after the card data head 34a reaches the end of the first data portion 27a, the multivibrator 62 returns to its stable state, thereby setting a flip-flop 67. The output of the flip-flop in turn enables gates 68 to apply the output of the converter 60 to the oscillators 48 for transmission to the data processing unit 28.

The selected oscillators 48 remain active during the next interval, 50 milliseconds in the example, until the timing head 34b senses the second timing band T on the card 26. At that point a pulse from the head 34b triggers the multivibrator 62. The same pulse passes through an OR circuit 69 to clear the counter 59 and also to reset the flip-flop 67, thereby disabling the gates 68. The data head has now reached the second data portion 27a on the card 26 and it begins to feed pulses therefrom to the counter 59.

The counter 59 thus accumulates the second digit of the card identifying number. The transmitting unit 10 transmits this digit to the data processing unit 28 when the multivibrator 62 once again returns to its stable state.

In this manner, the successive digits of the card identifying number are transmitted to the data processing unit 28. After the last digit has been transmitted, the card reader 34 trips a limit switch 72 that turns off the motor 58. The limit switch also clears the counter 59, resets the flip-flop 67 and sets an amount flip-flop 74.

The output of the flip-flop 74 sets the flip-flop 38 to turn on clock 42 and enable a set of gates 76 connecting the distributor output terminals 44a to the amount register 22. The register 22 is similar in function to the dialing unit 32, in that it makes predetermined connections between the respective distributor terminals 44a and the converter input terminals 46a. However, these various connections can be changed by means of the switches operated by the thumbwheels 22a (FIG. 1).

Preferably, the register 22 includes one or more additional circuit conductors which transmit an "end of message" signal to the data processing unit after the amount of the transaction has been transmitted. These conductors, which are energized by the distributor 44 after all the thumbwheel switches have been energized, may, for example, connect to the converter input terminals 46a corresponding to the symbols * and ◊. Receipt of these symbols indicates to the data processing unit that the transmission is ended.

After the amount of the transaction and the "end of message" signal have thus been transmitted to the data processing unit 28, the distributor output terminal 44b becomes energized, thereby resetting the flip-flops 74 and 38. This turns off the clock 42 and disables the gates 76. The operator then waits for a return signal from the data processing unit 28 indicating whether or not the transaction involves any problems.

For the sake of clarity, we have omitted conventional safety features from the FIG. 2 circuit diagram. For example, the automatic dial button 16 may be provided with contacts arranged to clear the counter 59 and reset the various flip-flops except those that are to be set by actuation of this button. Similarly, when the power to the transmitter 10 is turned on, the counter 59 should be cleared, the flip-flops should be reset and the distributor output terminal 44b should be energized by some suitable circuitry. Also, the telephone buttons 16 and 20 (FIG. 1) may be "locked-out" electrically when the transmitter 10 is operating in its automatic mode, so as to prevent transmission of spurious signals to the data processing unit 28.

Should the data transmitter 10 fail to operate as described above, the cashier can dial the data processing unit 28.

Should the data transmitter 10 fail to operate as described above, the cashier can dial the data processing unit manually by means of the buttons 16 (FIG. 1) and then transmit all the transaction information by means of these same buttons.

The card reader 34 is illustrated in FIGS. 4–6A. It includes a reading head unit 80 resiliently mounted on a carriage 82 for movement along the recording medium 25 on the card 26. It is guided along its path by a lead screw 84 and also a guide rod 86.

Figure 4:
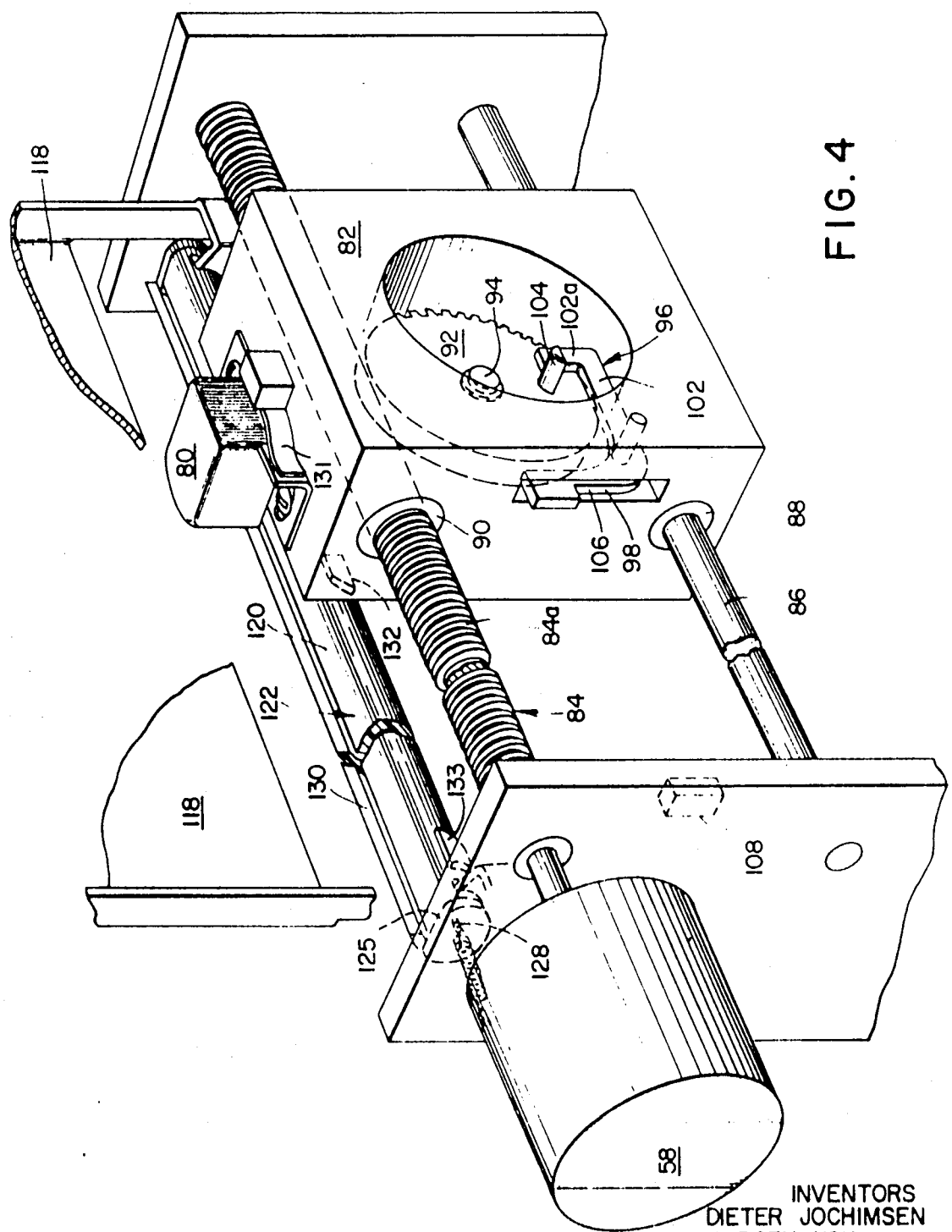
FIG. 4 is a fragmentary perspective of the card reader incorporated in the data transmitter.
Figure 5:
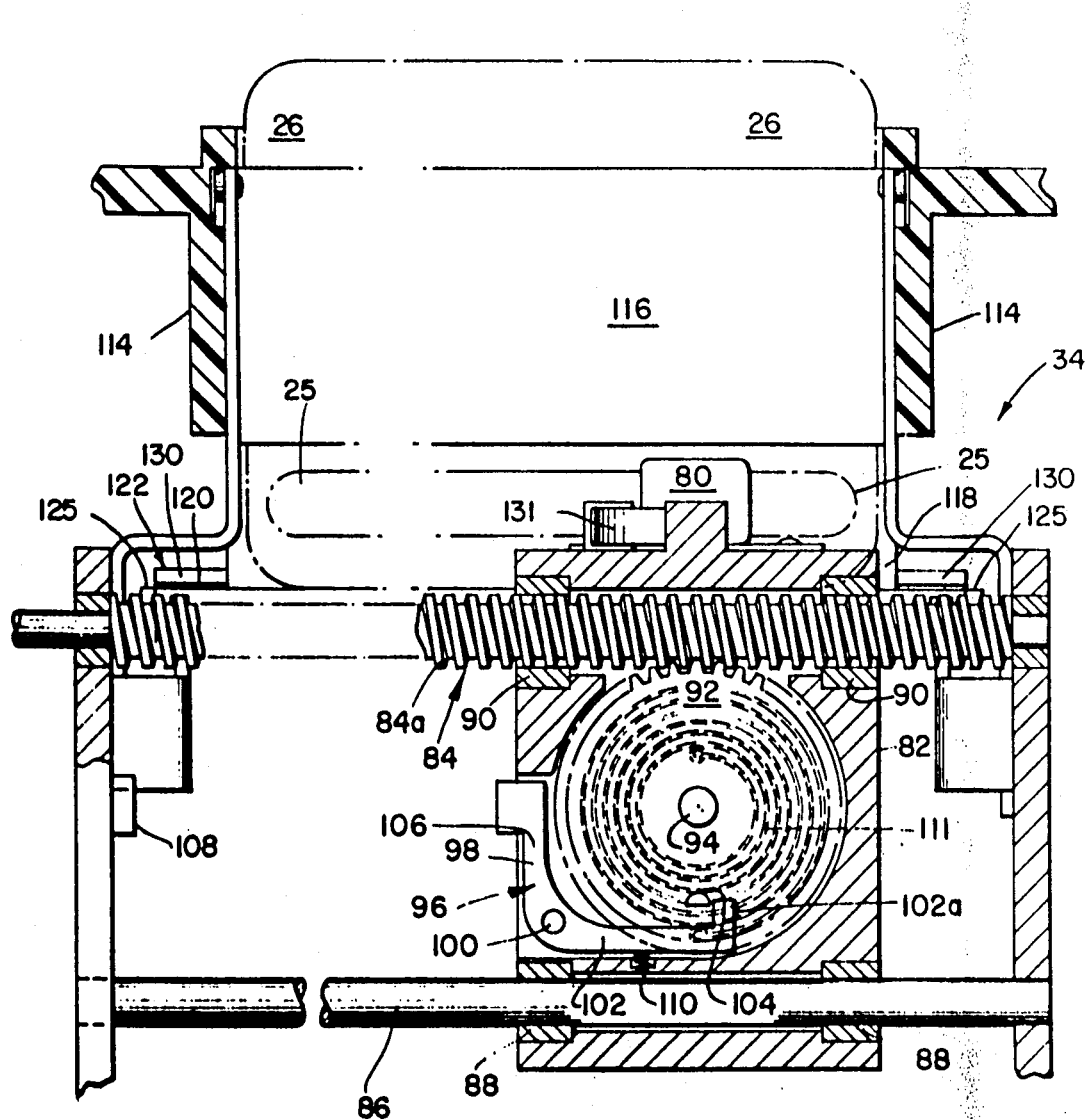
FIG. 5 is a side view with parts in section of the card reader.

More specifically, as best seen in FIGS. 4 and 5 the guide rod 86 extends through a pair of bushings 88 which fix the position of the carriage 82 with respect to the guide rod. Similarly, a pair of bushings 90, engaging the lead screw 84, fix the carriage 82 with respect to the lead screws. The lead screw 84 and guide rod 86 thus maintain the desired position of the reading head unit 80 transverse to the direction of movement along the lead screws. The thread 84a on the lead screw preferably has a trapezoidal or other profile providing a larger outer surface area. This presents an essentially continuous surface to the bushings 90, thereby contributing to the stabilization of the carriage 82 and minimizing damage to the bushings 90 by rotation of the lead screw 84.

When the carriage 82 has transversed the length of the magnetic medium 25 during reading of the card 26, the vertical arm 106 of the lever 98 engages a fixed stop 108. This causes the lever to rotate clockwise against the force of a spring 110, thereby releasing the pin 104 from the lever arm 102. With the gear 92 now free to rotate in the counterclockwise direction, a spiral return spring 111 can rotate the gear 92 along lead screw 84 in a motion analogous to that of a rack and pinion and thereby retract the carriage 82 to its extreme right-hand position. At the end of this rightward travel, the pin 104 once again engages the lever arm tip 102a which has been moved upward into the locking position by the spring 110. The carriage 82 is then in position to read the next card 26 inserted into the card reader. For this type of operation, the circumference of the gear 92 corresponding to its pitch diameter will equal the distance traversed by the carriage 82.

FIGS. 6 and 6A illustrate a convenient arrangement for positioning and locking the card 26 in place when its identification number is being read. When the card is dropped into the slot 24 (FIG. 1) it is longitudinally positioned by a pair of guides 114 (FIG. 5). It is loosely positioned in the lateral direction between a bearing plate 116 and a swing plate 118 (FIG. 6). The bottom of the card rests on the longitudinally extending lip 120 of a split tube 122. The tube 122 is mounted for rotation about shaft 124 extending through end plates 125 on the tube.

After the data processing unit 28 (FIG. 3) has answered the call from the data transmitter 10 and asked for the transmission of the data relating to the transaction, the operator depresses the card 26 as mentioned above. The resulting downward force on the lip 120 (FIG. 6) rotates the tube 122 clockwise around the shaft 124, thereby bringing the lip 120 to bear against the lower end of the swing plate 118. This forces a rightwardly extending bearing portion 118A against a back surface of the card 26 and thus brings the recording medium 25 into engagement with the reading head 80.

The pin 128 is now on the right of the shaft 124 and the spring 126 therefore provides a clockwise torque maintaining this locked position of card 26. As described above, the same downward movement of the card 26 activates the card-sensing switch 52 (FIG. 3) to initiate, among other things, operation of the card reader 34 to read the identifying number on the card 26. A spring 131 urges the head 80 against the medium 25 and thus makes the head follow any irregularities in the surface of the medium.

With further reference to FIG. 6, when the identifying number has been read from the card 26 and just before the carriage 82 has reached its leftmost position (FIG. 5) a wedge 132 extending from the carriage engages a cam 133 on the carriage side of the tube 122 and cams it upwardly to cause counterclockwise rotation about the shaft 124. After the pin 128 has passed around the shaft 124, the spring 126 aids in this rotation, which releases the swing plate 118 and permits the card to move away from the reading head unit 80. At the same time the upward movement of the lip 120 provides a perceptible upward motion of the card 26 so that the operator will know that the card can now be retrieved from the data transmitter 10.

Thus, we have described a credit card transaction system providing rapid, low-cost transmission of transaction data to a centrally located data processing unit, and thereby reducing the likelihood that someone will honor a stolen or bogus credit card or a card held by a delinquent bill payer. The system makes use of a novel data transmitter which is small in size and has a relatively low cost, yet provides for efficient entering and transmission of the various data associated with each transaction. In addition to electronic circuits which are for the most part readily obtainable in integrated circuit form, it includes as mechanical components a card reader and a card positioning and locking unit which are compact, easily manufactured and very reliable operation.

It will thus be seen that the objects set forth above, among those made apparent from the preceding description, are efficiently attained and, since certain changes may be made in the above product without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. A data-transmitting unit comprising
    A. a clock,
    B. a distributor connected to energize successive output terminals thereof in response to pulses from said clock,
    C. a code generator for transmitting character signals over a telephone line in response to signals applied to input terminals of said code generator,
    D. A data register into which data relating to transaction can be entered and which, when connected between said distributor output terminals and said code generator input terminals, interconnects the respective terminals according to the data entered in said register,
    E. a card reader arranged to
        1. read information recorded on a data card, and
        2. energize said code generator input terminals in accordance with said information, and
    F. switching means arranged upon initiation to
        1. connect said data register between said distributor and said code generator to transmit the data recorded in said register, and
        2. initiate operation of said card reader to read the information on said card and transmit said information over said telephone line.
2. A data-transmitting unit as defined in claim 1 and further including
    A. a dialing unit which, when connected between said distributor output terminals and said code generator input terminals, interconnects respective terminals in accordance with a telephone number to be dialed,
    B. a station-identifying unit which, when connected between said distributor output terminals and said code generator input terminals, interconnects respective terminals in accordance with an identification number of said station, and
    C. said switching means being arranged also to
        1. connect said dialing unit between said distributor and said code generator to dial said telephone number, and
        2. to connect said identification unit between said distributor and said code generator to transmit said identification number.
3. A data-transmitting unit as defined in claim 2 and further including
    A. card-holding means arranged to hold a card for reading by said card reader, and
    B. a card-sensing switch responsive to the insertion of a card into said card-holding means, said switching means being arranged so that actuation of said card-sensing switch is required for transmission of the information from said card reader.
4. A data-transmitting unit as defined in claim 1 wherein said data register comprises a plurality of thumbwheel operated switches which control the contents of said register.
5. The system defined in claim 1 in which each of said transmitters is arranged to transmit information by means of a tone code.
6. The system defined in claim 1 in which
    A. said interconnecting telephone system has a tone code dialing arrangement, and
    B. said transmitter is arranged to transmit information.
7. The system defined in claim 1 in which each of said transmitters includes a manual dialing mechanism and a handset arranged for operation as a conventional telephone.
8. The system defined in claim 2 in which each of said data transmitters reads said data card and transmits said identification numbers and register contents automatically following an initiating signal.
9. A data-transmitting unit as defined in claim 1 wherein said register includes means for transmitting an end of message signal over said telephone line after the data relating to the transaction has been transmitted.
10. A data-transmitting unit as defined in claim 9 and further including
    A. a data register into which data relating to a transaction can be entered and which, when connected between said timing pulse means and said code generator input terminals, interconnects the respective terminals according to the data entered in said register, and
    B. said switching means being arranged also to connect said data register between the timing pulse means and said code generator to transmit the data recorded in said register.
11. A data-transmitting unit comprising
    A. a clock,
    B. a distributor connected to energize successive output terminals thereof in response to pulses from said clock,
    C. a code generator for transmitting character signals over a telephone line in response to signals applied to input terminals of said code generator,
    D. a dialing unit which, when connected between said distributor output terminals and said code generator input terminals, interconnects respective terminals in accordance with a telephone number to be dialed,
    E. a station-identifying unit which, when connected between said distributor output terminals and said code generator input terminals, interconnects respective terminals in accordance with an identification number of said station,
    F. an amount register into which an amount of a transaction can be entered and which, when connected between said distributor output terminals and said code generator input terminals, interconnects the respective terminals according to the data entered in said register, G. a card reader arranged to
   1. read information recorded on a data card, and
   2. energize said code generator input terminals in accordance with said information, and H. switching means
   1. arranged upon initiation to connect said dialing unit between said distributor and code generator to dial said telephone number,
   2. arranged upon further actuation to
      a. connect said identification unit between said distributor and said code generator to transmit said identification number,
      b. connect said data register between said distributor and said code generator to transmit the data recorded in said register,
      c. initiate operation of said card reader to read the information on said card and transmit said information.

12. The data-transmitting unit defined in claim 11
A. including card-holding means arranged to hold a card for reading by said card reader, and
B. including a card-sensing switch responsive to the insertion of a card into said card-holding means, said switching means being arranged so that actuation of said card sensing switch is required for transmission of the information from said card reader.

13. A data-transmitting unit comprising
A. timing pulse means, including a clock and distributor,
B. a tone code generator for transmitting audible character signals over a telephone line in response to signals applied to input terminals of said code generator,
C. a decimal to two-out-of-eight converter connected to the input of said tone code generator,
D. a dialing unit which, when connected between said timing pulse means and said converter input terminals, interconnects respective terminals in accordance with a telephone number to be dialed,
E. a station-identifying unit which, when connected between said timing pulse means and said converter input terminals, interconnects respective terminals in accordance with an identification number of said station, and
F. switching means arranged upon initiation to
   1. connect said dialing unit between said timing pulse means and said code generator to dial said telephone number, and
   2. connect said identification unit between said timing pulse means and said code generator to transmit said identification number.

14. A data-transmitting unit comprising
A. timing pulse means,
B. a code generator for transmitting character signals over a telephone line in response to signals applied to input terminals of said code generator,
C. a dialing unit which, when connected between said timing pulse means and said code generator input terminals, interconnects respective terminals in accordance with a telephone number to be dialed,
D. a station-identifying unit which, when connected between said timing pulse means and said code generator input terminals, interconnects respective terminals in accordance with an identification number of said station,
E. switching means arranged upon initiation to
   1. connect said dialing unit between said timing pulse means and said code generator to dial said telephone number, and
   2. connect said identification unit between said timing pulse means and said code generator to transmit said identification number, and
F. a card reader arranged to read information recorded on a data card and energize said code generator input terminals in accordance with said information, said switching means being arranged also to initiate operation of said card reader to read the information on the card and transmit said information over said telephone line.

* * * * *